US009739290B2

(12) United States Patent
Lucas et al.

(10) Patent No.: US 9,739,290 B2
(45) Date of Patent: Aug. 22, 2017

(54) COMPRESSOR SYSTEM WITH PRESSURE PULSATION DAMPENER AND CHECK VALVE

(71) Applicant: Ingersoll-Rand Company, Davidson, NC (US)

(72) Inventors: Michael John Lucas, Mooresville, NC (US); James Li, Mooresville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 113 days.

(21) Appl. No.: 14/597,868

(22) Filed: Jan. 15, 2015

(65) Prior Publication Data

US 2015/0198179 A1    Jul. 16, 2015

Related U.S. Application Data

(60) Provisional application No. 61/928,190, filed on Jan. 16, 2014.

(51) Int. Cl.
| | |
|---|---|
| *F16K 15/00* | (2006.01) |
| *F04D 29/66* | (2006.01) |
| *F16K 15/06* | (2006.01) |
| *F04B 43/02* | (2006.01) |
| *F04B 49/06* | (2006.01) |

(52) U.S. Cl.
CPC .......... *F04D 29/668* (2013.01); *F04B 43/026* (2013.01); *F04B 49/06* (2013.01); *F16K 15/06* (2013.01); *F04B 2205/05* (2013.01); *Y10T 137/0396* (2015.04); *Y10T 137/7904* (2015.04)

(58) Field of Classification Search
CPC ...... F04D 29/668; F04B 43/026; F04B 49/06; F04B 2205/05; F16K 15/06; Y10T 137/7933; Y10T 137/7932; Y10T 137/7929; Y10T 137/7922; Y10T 137/0396; Y10T 137/7904
See application file for complete search history.

(56) References Cited

U.S. PATENT DOCUMENTS

| | | | |
|---|---|---|---|
| 2,943,641 A | | 7/1960 | Arnold |
| 3,134,394 A | | 5/1964 | Ohta |
| 3,150,689 A | | 9/1964 | Lieberman |
| 3,194,255 A | * | 7/1965 | Flaton ............ F16K 15/06 137/220 |
| 3,374,858 A | | 3/1968 | Richards |
| 3,540,472 A | * | 11/1970 | Brady ............ F16K 15/06 137/516.29 |

(Continued)

OTHER PUBLICATIONS

"Pulsation Damper Bladderless No Moving Parts Drawing Menu", internet product advertisement, as early as Oct. 2, 2014, 2 pages, PulseGuard, internet; http://www.pulsation-dampners.com/Bladderless-No-Moving_Parts_Drawings_Menue.html.

(Continued)

*Primary Examiner* — Jessica Cahill
(74) *Attorney, Agent, or Firm* — Taft Stettinius & Hollister LLP

(57) ABSTRACT

A system is disclosed wherein a pressure pulse dampener is in fluid communication with a compressed fluid. The pulse dampener being operable for reducing pressure pulsations within the fluid. In some embodiments a check valve can be in fluid communication with the pulse dampener to prevent reverse flow of the compressed fluid.

24 Claims, 12 Drawing Sheets

(56) References Cited

U.S. PATENT DOCUMENTS

| | | | | |
|---|---|---|---|---|
| 3,578,107 | A | * | 5/1971 | Everett .................... F16L 55/02 |
| | | | | 181/232 |
| 3,616,627 | A | | 11/1971 | Everett |
| 3,635,309 | A | | 1/1972 | Nemcansky et al. |
| 4,129,196 | A | * | 12/1978 | Everett ..................... F01N 1/12 |
| | | | | 181/269 |
| 4,299,253 | A | | 11/1981 | Burton |
| 4,846,228 | A | | 7/1989 | Blanscet |
| 4,911,196 | A | | 3/1990 | Kemp |
| 6,132,191 | A | | 10/2000 | Hugenroth et al. |
| 6,698,446 | B2 | | 3/2004 | Cornwell |
| 7,568,898 | B2 | | 8/2009 | Shoulders |
| 8,136,547 | B2 | | 3/2012 | Francini et al. |
| 8,381,764 | B2 | * | 2/2013 | Matsubara ............ F16K 15/063 |
| | | | | 137/220 |
| 2003/0155027 | A1 | | 8/2003 | Michlin et al. |
| 2006/0124385 | A1 | * | 6/2006 | Lucas ............... F16L 55/02727 |
| | | | | 181/258 |
| 2007/0215215 | A1 | | 9/2007 | Arentsen et al. |
| 2008/0256951 | A1 | | 10/2008 | Delavan |
| 2009/0218164 | A1 | | 9/2009 | Lucas et al. |
| 2010/0024891 | A1 | | 2/2010 | Francini et al. |

OTHER PUBLICATIONS

International Search Report, Ingersoll-Rand Company, PCT/US2015/011702, Jan. 14, 2016, 3 pages.

Written Opinion, Ingersoll-Rand Company, PCT/US2015/011702, Jan. 14, 2016, 13 pages.

* cited by examiner

COMPRESSOR SYSTEM WITH PRESSURE PULSATION DAMPENER AND CHECK VALVE

CROSS REFERENCE TO RELATED APPLICATIONS

The present application claims the benefit of U.S. Provisional Patent Application 61/928,190 filed Jan. 16, 2014, the contents of which are incorporated herein by reference in their entirety.

BACKGROUND

The present disclosure generally relates to a pressure pulsation dampener with a check valve and a compressor system including a pressure pulsation dampener with a check valve. Pressure pulsations that may occur in a working fluid exiting a compressor, for example, may have a relatively large amplitude and may cause damage to downstream piping components and may cause relatively extreme noise levels. For instance, a typical oil-free compressor rated for 105 psi gage may have a dynamic pressure at the discharge of the compressor from 90 psig to 120 psig at a frequency related to the port passing frequency. The port passing frequency represents the number of times the compressor discharge port is opened to allow compressed air to exit the compressor. These pulsations begin at the discharge of the compressor and migrate downstream through the entire piping system.

Some check valves may not be suitable for effective long-term use at the outlet of certain compressors and they also may be susceptible to flow induced vibration. Pressure pulsations may repeatedly impact a check valve plunger causing excessive vibration and stress that may result in failures.

Compressor machinery manufacturers may design pulsation suppression devices using traditional muffler style designs. Some pressure pulsation dampener designs may contain components traditionally found in mufflers and exhaust systems. Some dampener designs may include components such as choke tubes, orifice plates, branch tubes and Helmholtz resonators, absorptive linings, and/or perforated tubes. Muffler systems may be designed by acousticians using acoustic principles founded on solutions to the wave equation. In many muffler designs, it is assumed that the pressure pulsations propagate as an acoustic wave that travels at the speed of sound. The propagation of an acoustic wave is defined as the transport of energy through the compression and expansion of the molecules in the media in which the acoustic wave propagates. An acoustic wave propagates at the speed of sound and for air at room temperature the speed is around 341 m/sec.

Some existing systems have various shortcomings, drawbacks, and disadvantages relative to certain applications. Accordingly, there remains a need for further contributions in this area of technology.

SUMMARY

One embodiment of the present invention is a unique pressure pulsation dampener and a check valve assembly. Other embodiments include apparatuses, systems, devices, hardware, methods, and combinations for a pressure pulsation dampener and a check valve assembly. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION OF REPRESENTATIVE EMBODIMENTS

Figure 1:
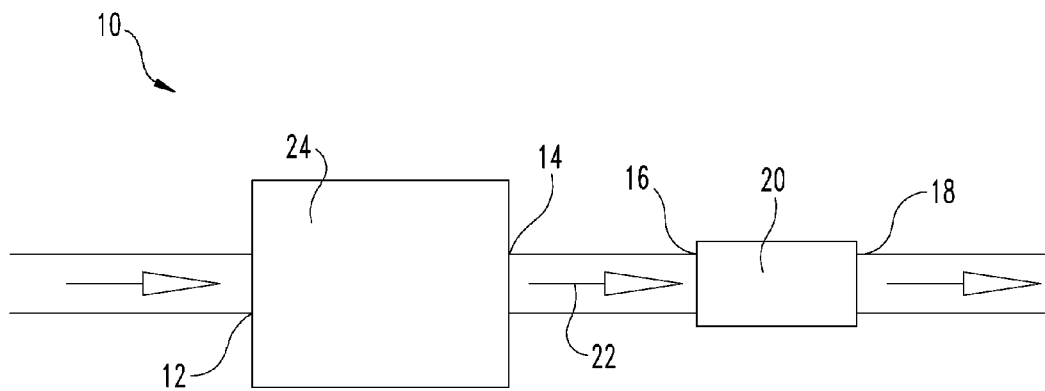
FIG. 1 is a schematic block diagram of an exemplary compressor system.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

The present disclosure is generally directed to suppressing, reducing, and/or dampening pressure pulsations in a working fluid near the source of the pulsations, or in the near-field, using a pressure pulsation dampener and an aerodynamic check valve assembly. The design of the check valve assembly may lower the stress upon the check valve assembly and check valve components to reduce the failure rate of those parts. The pressure pulsation dampening device and check valve assembly described herein may also be used to suppress pulsations in other fluid flows, and at the output of any device, such as a compressor or blower, as would be understood by one of ordinary skill in the art.

Passive noise and fluid dynamic control share similar physical principals. The wave speed of an acoustic field is the speed of sound while the wave speed of a fluid dynamic eddy (vortex) field is the convective speed of the gas. The wavelength for a gas dynamic flow is the length between two eddies. From acoustic study we know that $C=\lambda*f$, where C is the speed of sound, $\lambda$ is the acoustic wavelength, and f is the frequency. From Fluid Dynamics we know that $U=L*F$, where U is the convective speed of the gas L is the eddy distance of separation, and f is the frequency of the gas unsteady dynamic. In compressors C is typically much greater than U, i.e. the Mach number defined as $m=u/c$ is less than 0.2 in most compressor applications. Given the above relationships, a passive control device for gas dynamics will require smaller geometric length ($\lambda$ is much greater than L) scales to successfully cancel an oscillation. The present disclosure teaches a gas dynamic passive cancellation device. The length scales for this device are chosen based on a gas velocity of U. Acoustic fields may persist from a compressor despite the presence of this device, but the apparatus and methods disclosed herein will attenuate any further generation of an acoustic field by canceling the eddies. As will be explained in further detail below, an annular entrance with one defined exit on the side of the pulse dampener will cause the flow streamlines and associated eddies to travel different lengths therethrough as each path length is different depending on the flow azimuth entrance angle.

Near the discharge of a compressor, in the near-field, there are pressure pulsations in the fluid at the compressor outlet that are generated by unsteady gas dynamic flows. The gas dynamic becomes the origin for pressure pulsations that propagates as an aerodynamic wave that travels at the convective speed of the gas. Generally, the main source of noise in the near-field is due to gas dynamic disturbances originating from the opening and closing of the discharge port at the outlet of the compressor. The generation of pressure pulsations near the discharge of the compressor may be described as an aerodynamic phenomenon. Downstream from the compressor discharge port, the aerodynamic instabilities become smaller while the pressure pulsation disturbances evolve into an acoustic field. The acoustic field propagates at the speed of sound and it is the acoustic field that is the source of noise we hear from the compressor.

The working fluid exiting a compressor may be described as slugs of air that are discharged each time the rotors open and close. The gas flow is primarily influenced by its aerodynamic properties in the near-field; the pressure pulsations travel at the convective speed of the slugs of air and their speed is dictated by the mass flow through the compressor and the cross-sectional area of the piping. Further downstream, in the far-field, the slugs of fluid break down into small eddy structures. The aerodynamic component of the pressure pulsations still exists in the far-field, but its strength in amplitude has generally diminished. The acoustic component of the pressure pulsation, which has been present all along, now becomes the dominant term as the aerodynamic component weakens in the far-field.

Working fluid is directed to a pressure pulsation dampener and then may, in some embodiments, pass through a check valve assembly designed with an aerodynamic shape in order to minimize the pressure drop across the valve. The smooth transition of the fluid across the check valve minimizes the flow induced vibration the check valve is subjected to, which may decrease the failure rate of the check valve assembly. The check valve assembly may be integrated with the body of the pressure pulsation dampener to reduce the number of parts required to implement the improved pressure pulsation dampener and check valve. In other embodiments, the check valve assembly may be separate from the pressure pulsation dampener, and may have a flow path in axial alignment with that of the pressure pulsation dampener, thereby ensuring an aerodynamic transition of the working fluid from the pressure pulsation dampener to the check valve assembly. The aerodynamic design of the pressure pulsation dampener and the check valve assembly reduces the pressure drop across the check valve assembly and protects the check valve assembly parts from unnecessary wear. The check valve is further designed to be spring biased in a closed position to prevent reverse flow of the working fluid back into the compressor, for example, when the compressor is unloaded.

The pressure pulsation dampener creates a specially designed flow path for the working fluid in the near-field, which plays a central role in attenuating the pressure pulsations of a compressor or blower. The check valve assembly has an aerodynamic design which may increase the dependability of the check valve assembly and the efficiency of the system. As another effect of dampening the pressure pulsations in the near-field of the working fluid flow based on aerodynamic principles, the acoustic vibrations in the far field of the working fluid flow are likely to be diminished. The term aerodynamics, as used herein, includes fluid dynamics and/or gas dynamics, depending on the working fluid being used in the particular pressure pulsation dampener.

Referring to the drawings, and in particular FIG. 1, aspects of a non-limiting example of a compressor system 10 are depicted in accordance with an embodiment of the present specification. Compressor system 10 may include a compressor or blower 24 having an inlet 12 and an outlet 14 at the discharge side. A working fluid 22 travels into the compressor via the inlet 12 and exits the compressor via the outlet 14. Compressor outlet 14 is in flow communication with the inlet 16 of the pressure pulsation dampener 20, directly or indirectly. The system 10 may include a check valve assembly 60 that may be integrated with the pressure pulsation dampener 20 or may be a separate assembly. In addition, the check valve assembly 60 may be used with other types of devices other than a dampener or be used as a standalone assembly.

In one form, compressor 24 is a screw compressor. In a particular form, compressor 24 is an oil-free screw compressor. In other embodiments, compressor 24 may be a piston compressor, a lobed compressor, or any positive displacement compressor. In still other embodiments, compressor 24 may be a centrifugal compressor, a vane compressor, a blower, a fan, or a fluid pump. Compressor 24 is configured to discharge a pressurized working fluid 22 via the compressor outlet 14 and on to a desired location. Compressor 24 may also be any apparatus that is capable of expelling a working fluid that contains pressure pulsations in need of damping, as would be understood by one of ordinary skill in the art.

In one embodiment, compressor 24 pressurizes a working fluid 22, such as air, and discharges the pressurized fluid at the outlet 14 for use by the downstream components. The pressurized working fluid 22 may travel directly or indirectly to the inlet 16 of a pressure pulsation dampener 20. The working fluid 22 then exits the pressure pulsation dampener 20 at its outlet 18 and passes through the check valve assembly 60. The working fluid 22 exits the check valve assembly 60 with smaller amplitude pressure pulsations than were present in the working fluid 22 upon entering at the inlet 16.

Figure 2:
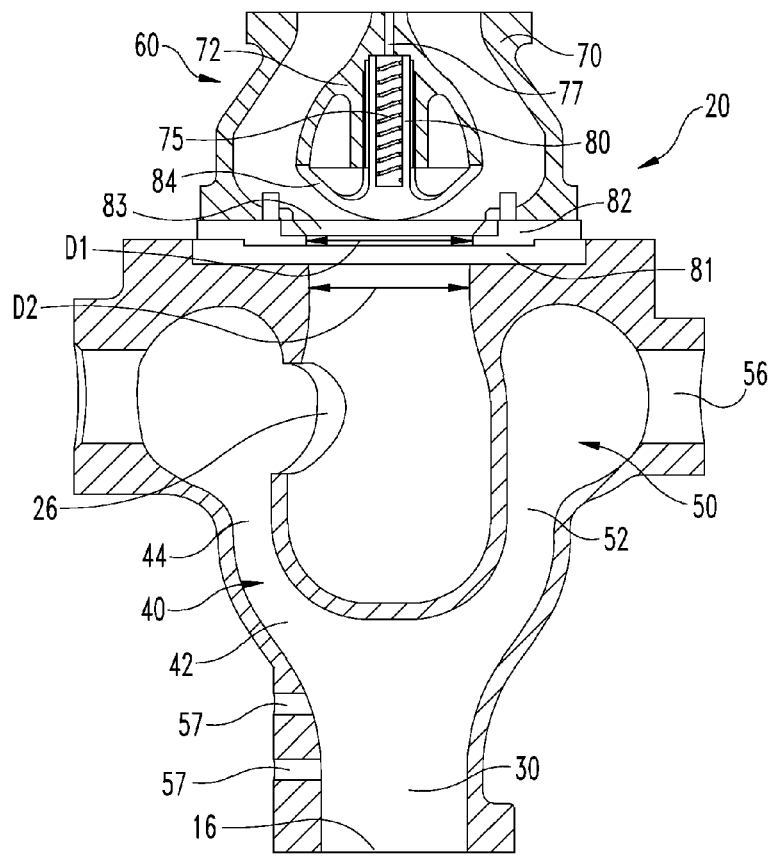
FIG. 2 is a cross-sectional illustration of a side view of an exemplary pressure pulsation dampener and a check valve assembly.

FIG. 2 illustrates one embodiment of the pressure pulsation dampener 20 and the check valve assembly 60. In the embodiment shown in FIG. 2, the check valve assembly 60 is connected or mounted to the pressure pulsation dampener 20, but the check valve assembly 60 is not integrated with the pressure pulsation dampener 20.

A working fluid 22, such as air, enters the chamber 30 from the inlet 16, and is then directed into an annular section 40. The annular section 40 may be an annulus that expands radially in the axial direction of flow. For example, the annular section 40 may have a higher rate of radial expansion at the inlet of the annular section 40 than at the outlet, resulting in an annular section 40 in the general shape of a bell. The pressure pulsation dampener 20 is shaped to then guide the working fluid 22 flow into a ring or toroidal chamber 50, where the flow of the fluid is generally circumferential or transverse to the annular section 40. The chamber 50 may have a toroidal shape as seen in FIG. 2, but other shapes are contemplated. In one embodiment, pressure pulsation dampener 20 may be cast as one part out of ductile iron or any other suitable material.

The pressure pulsation dampener 20 is shaped to allow the fluid flowing in annular section 40 to enter toroidal chamber 50 at any point around the circumference of toroidal chamber 50. The working fluid 22 then exits from one single port of the toroidal chamber 50. In one embodiment, the working fluid 22 exits from one exit opening 26 located on the inner diameter of the toroidal chamber 50. In another embodiment, the working fluid 22 exits from one exit opening located on the outer diameter of the toroidal chamber 50. In other embodiments, the working fluid 22 may exit at other locations (including multiple openings) of the toroidal chamber 50 and/or through other types of outlets. The distance the working fluid 22 travels inside the toroidal chamber 50 depends on the compass direction the working fluid 22 follows before entering the chamber 50.

For example, the working fluid 22 will travel furthest when the working fluid 22 enters the toroidal chamber 50 one hundred eighty degrees from the exit opening 26 of the toroidal chamber 50 and the working fluid 22 is flowing in the direction of the exit opening than if it enters the chamber one degree from the exit opening 26 and it is traveling in a direction toward the opening 26. The annular section 40 and the toroidal chamber 50 of the pressure pulsation dampener 20 create multiple paths for the working fluid 22 to flow before recombining at the exit opening 26. When the vortex structures in the working fluid 22 rejoin at the exit opening 26 of the toroidal chamber 50, the sum is averaged together. The phase differences resulting from the combined differences in the length of travel for the different flow paths yield a net flow that cancels the large eddy structures, thereby reducing the initial pressure pulsations in the flow of working fluid 22.

The pressure pulsation dampener 20 is designed to dampen the aerodynamic component of the pressure pulsation in the near-field of the working fluid 22 flowing out of a compressor 24, for example. Improvements in acoustic wave occurrences in the far-field typically result from effective dampening in the near-field.

FIG. 2 also shows that the shape of the dampener 20 in the annular section 40 may expand radially in the axial direction of the fluid flow path, with a larger maximum annular radius for the flow area at the outlet 44 of the annular section 40 than at the inlet 42 of the annular section 40. In one particular embodiment, the maximum annular radius expands more rapidly at the inlet 42 of the annular flow path than at the outlet 44 of the annular flow path, giving the dampener 20 a bell shape in the annular section 40.

The working fluid 22 exiting the outlet 44 of the annular section 40 is then directed to enter the toroidal chamber 50. It is contemplated that the working fluid 22 may enter at any point around the circumference of the toroidal chamber 50. In the embodiment shown in FIG. 2, the working fluid 22 from the annular section 40 may enter at the bottom of the toroidal chamber 50 and the annular flow-toroidal flow junction 52 may consist of an unobstructed annulus. The annular flow-toroidal flow junction 52 may be partially obstructed in other embodiments with ports or vanes, for example, as would be understood by one of ordinary skill in the art. Guide vanes or ports may also be employed at various other points inside the body of the pressure pulsation dampener 20. For example, further embodiments may also include clean out ports 56, pressure taps 57, and instrument ports at various locations on the body of the pressure pulsation dampener 20 and/or check valve assembly 60.

The working fluid 22 then travels within the toroidal chamber 50 in a direction generally transverse to the annular flow path 40 until it reaches the exit opening 26 of the toroidal chamber. The working fluid 22 within toroidal chamber 50 may travel in a clockwise or in a counterclockwise direction, depending on the compass direction the air follows before entering toroidal chamber 50. In one embodiment, the exit opening 26 of the toroidal chamber 50 is located on the inner circumference of the toroidal chamber 50.

The working fluid 22 is then directed to the check valve assembly 60 after exiting the toroidal chamber 50 at the exit port 26. The check valve assembly 60 includes a center body 70 with a center piece 72 and a plunger 80. The check valve assembly 60 is aerodynamically designed to minimize the pressure drop as the working fluid flows around the center piece 72.

Plunger 80 has a valve head 84 adjacent a valve seat 82 for abutment. In some embodiments the valve seat 82 may be mounted directly to the body of the pressure pulsation dampener 20 at the pressure pulsation dampener outlet 18 or in other embodiments, valve seat 82 may be mounted to mounting plate 81, which is mounted to the outlet 18 of the pressure pulsation dampener 20. In yet other embodiments the valve seat 82 may be mounted to the check valve assembly 60. Valve seat 82 may have a chamfered surface 98 to increase the surface area of the valve seat that is in direct contact with the surface area of the plunger valve head 84 or the plunger valve head 92 to increase the effectiveness of the seal against flow of working fluid 22 in some embodiments. In certain embodiments the valve head 84 may protrude into the outlet portion of the pressure pulsation dampener 20.

In one embodiment, the outer diameter of the flow path D2 exiting the pressure pulsation dampener 20 may be approximately equal to the outer diameter of the flow path D1 entering the check valve assembly 60 in order to provide a smooth, aerodynamic transfer of working fluid 22 from the pressure pulsation dampener 20 to the check valve assembly 60.

In some embodiments, a sealing piece 83 such as a gasket or other material to create a seal preventing flow of working fluid 22 between valve seat 82 and plunger valve head 84, may be mounted on valve seat 82 of the pressure pulsation dampener 20. The sealing piece 83 may be fixed or removable in some embodiments and it may be comprised of any material suitable to create a seal for a working fluid 22 flow, such as rubber, metal, or various polymers such as PTFE, as would be understood by one of ordinary skill in the art. Valve seat 82 may be removably affixed to mounting plate 81, which is then removably affixed to the body of pressure pulsation dampener 20 in some embodiments, or valve seat 82 may be removably affixed to the body of pressure pulsation dampener 20.

Plunger 80 is spring biased in the closed position so valve head 84 is seated on valve seat 82 when there is no working fluid 22 exiting the pressure pulsation dampener 20. When a working fluid 22 is exiting the pressure pulsation dampener 20, the working fluid 22 contacts and moves valve head 84 into an open position against the force of the bias spring 75.

Figure 3:
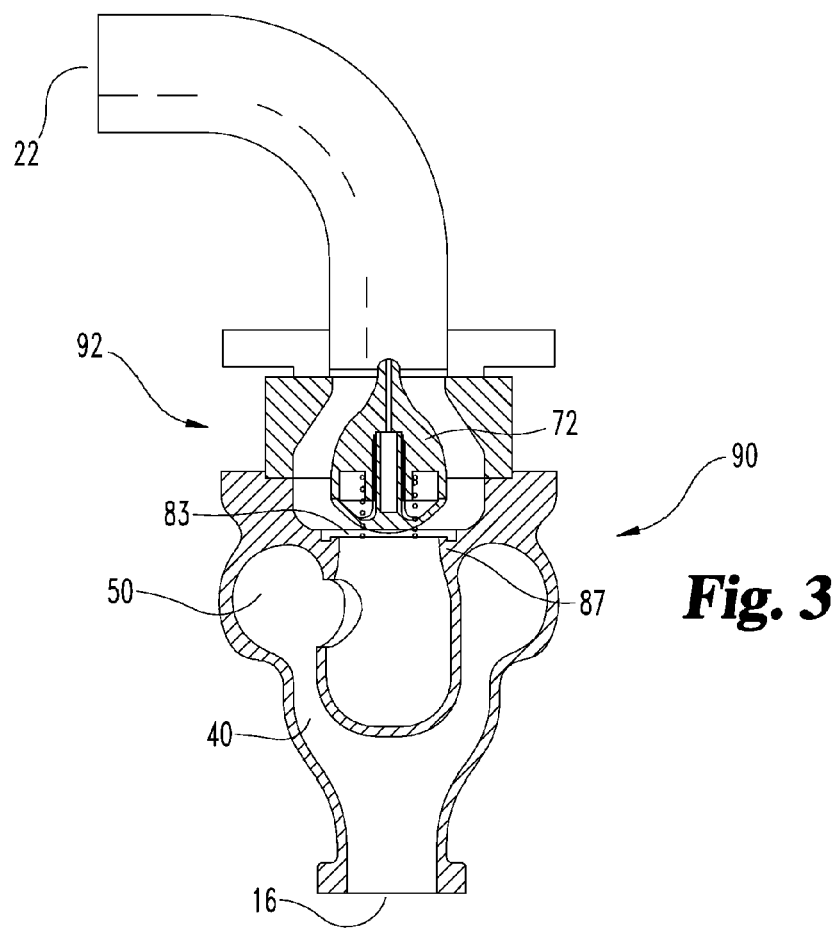
FIG. 3 is another cross-sectional illustration of a side view of an exemplary pressure pulsation dampener and a check valve assembly.

FIG. 3 illustrates another embodiment of a pressure pulsation dampener 90 and a check valve assembly 92. The working fluid 22 enters the pressure pulsation dampener 90 at the inlet 16, travels through an annular section 40, a ring or toroidal chamber 50, and exits through the check valve assembly 92.

In the embodiment shown in FIG. 3, a valve seat 87 for the check valve assembly 92 may be an integral portion of the body of pressure pulsation dampener 90. Furthermore, the valve seat 87 for the check valve assembly 92 may support a sealing piece 83 to create a seal against passage of working fluid 22 when the valve is in the closed position. As seen in FIG. 3, the check valve assembly 92 is integrated with the pressure pulsation dampener 90 as the valve seat 87 and sealing piece 83 are located within the pressure pulsation dampener 90 and the center piece 72 extends into the pressure pulsation dampener 90.

It is contemplated that components or parts from one embodiment of the pressure pulsation dampener or check valve assembly may be used in another embodiment of the pressure pulsation dampener or check valve assembly.

Figure 4:
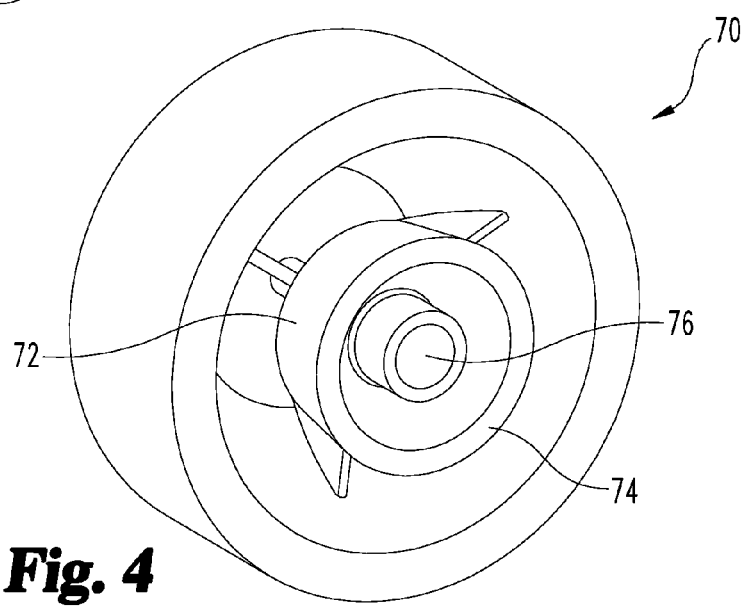
FIG. 4 is a perspective view of a portion of an exemplary check valve assembly center body from the direction the working fluid flows through the check valve assembly.

FIG. 4 is a perspective view of an exemplary embodiment of the center body 70 from the direction the working fluid flows through the check valve assembly 60. The center body 70 and center piece 72 are aerodynamically shaped to minimize pressure drops across the valve. In one embodiment, the check valve assembly 60 may be made of stainless steel or cast iron. In one embodiment, the center piece 72 has a smoothly decreasing outer diameter in the axial direction of the fluid flow in order to minimize any eddies behind the center piece 72 that may occur as the working fluid 22 flows around the center piece 72. The aerodynamic design of the center piece 72 may provide that the valve function is not adversely affected by turbulence in the area of the valve head 84, which could cause the valve head 84 to lift off the valve seat 87. The center piece 72 has a bottom surface 74 facing opposite the direction the working fluid flows through the check valve assembly and a top surface 78 (see FIG. 5) that faces the direction the working fluid flows through the check valve assembly. The bottom surface 74 is adjacent the back of the plunger valve head 84 when the plunger 80 of the check valve assembly 60 is in the open position. The bottom surface of the center piece 74 may contain a recess 76 designed to be in axial alignment with the bias spring 75 used to spring bias the plunger 80 in a normally closed position.

Figure 5:
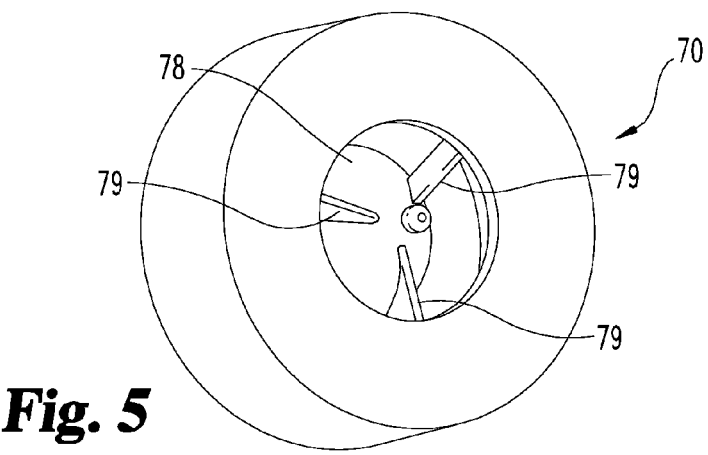
FIG. 5 is a perspective view of a portion of an exemplary check valve assembly center body from the direction opposite the direction the working fluid flows through the check valve assembly.

FIG. 5 is a perspective view of an exemplary embodiment of the center body 70 from the direction opposite the direction the working fluid 22 flows through the check valve assembly 60. The top surface of the center piece 78 and its smoothly curving surface is visible. This aerodynamic design helps to minimize the pressure drop as the working fluid flows through the valve assembly 60. In one embodiment, as the working fluid travels past the center piece 72 it may be directed through three guide vanes 79. The vanes 79 may be designed and positioned to reduce any swirling turbulent flow. In one embodiment, the vanes also serve to support the center piece 72 within the center body 70. It is contemplated that in other embodiments a different number of guide vanes 79 may be used.

Figure 6B:
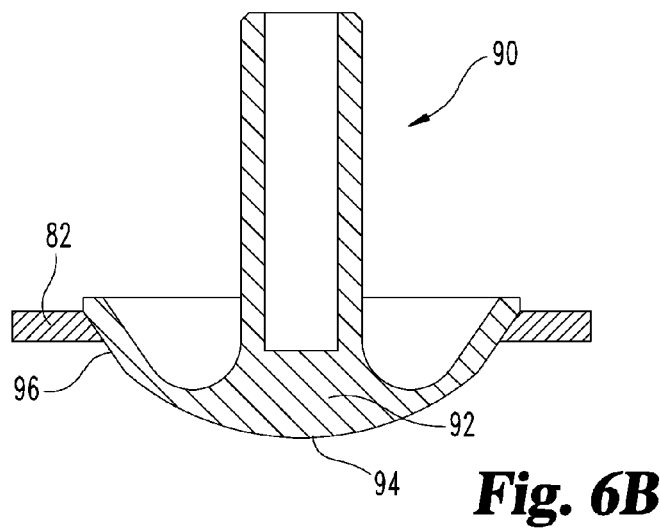
FIG. 6B is cross-sectional side view of another exemplary check valve assembly plunger from the direction the working fluid flows through the check valve assembly.
Figure 6A:
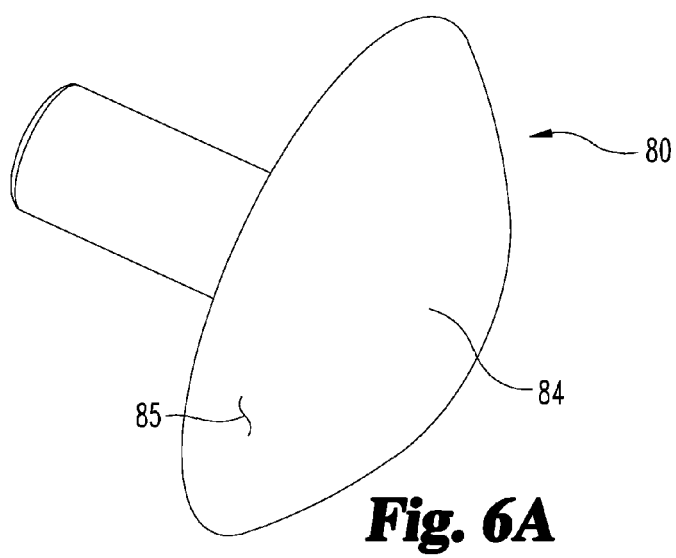
FIG. 6A is a perspective view of an exemplary check valve assembly plunger from the direction the working fluid flows through the check valve assembly

FIG. 6A is a perspective view of an exemplary embodiment of the plunger 80 from the direction the working fluid 22 flows through the check valve assembly 60. Plunger valve head 84 has two opposing surfaces. In one embodiment, a first substantially smooth, convex surface 85 is in flow communication with the working fluid 22 exiting the pressure pulsation dampener 20 in order to minimize the pressure drop as the working fluid 22 passes over the check valve assembly 60.

It is contemplated that the surface 85 may be shaped differently than seen in FIG. 6A such as having a portion around the edge of the plunger valve head 84 be flat and/or at a different angle than the rest of the surface 85. For instance, in other embodiments, a plunger valve head assembly 90 is shown in FIG. 6B, where the plunger valve head 92 is chamfered at the outer edge. The center surface 94 of the plunger valve head 92 has a generally convex shape, which may have a surface that is unpolished cast metal. The outer circumferential surface 96 of the plunger valve head 92 may be chamfered to sealingly engage the valve seat 82 and the outer circumferential surface 96 may be polished cast metal, for example. It is contemplated that the plunger valve head assembly 90 shown in FIG. 6B may be used in any of the other embodiments.

Figure 7:
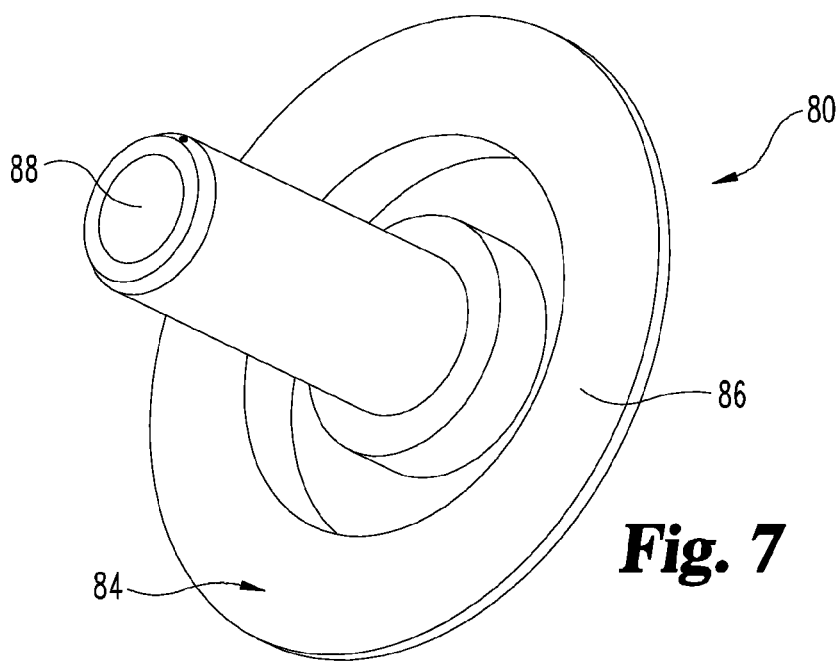
FIG. 7 is a perspective view of an exemplary check valve assembly plunger from the direction opposite the direction working fluid flows through the check valve assembly.

FIG. 7 is a perspective view of an exemplary embodiment of the plunger 80 from the direction opposite the direction the working fluid 22 flows through the check valve assembly 60. Plunger valve head 84 has a second surface 86, opposing convex surface 85, which is substantially planar. This aerodynamic design may help to minimize the pressure drop as the working fluid 22 flows through the check valve assembly 60 and to minimize mechanical wear on the parts of the check valve assembly 60. FIG. 7 shows an exemplary embodiment of the substantially planar surface 86 of the valve head 84, which is designed to abut the center piece 72 of the center body 70. In one embodiment, valve head 84 has approximately the same maximum outer circumference as the maximum outer circumference of the center piece 72 in the center body 70. This may minimize the protrusion of the plunger 80 and center piece 72 of the center body 70 into the flow of working fluid 22 through the check valve assembly 60, thereby reducing turbulence in the fluid flow and the pressure drop across the check valve assembly 60. FIG. 7 also shows the recess 88, which is configured in some embodiments to be in axial alignment with the bias spring 75 in order to spring bias the plunger 80 in a closed position.

Figure 8:
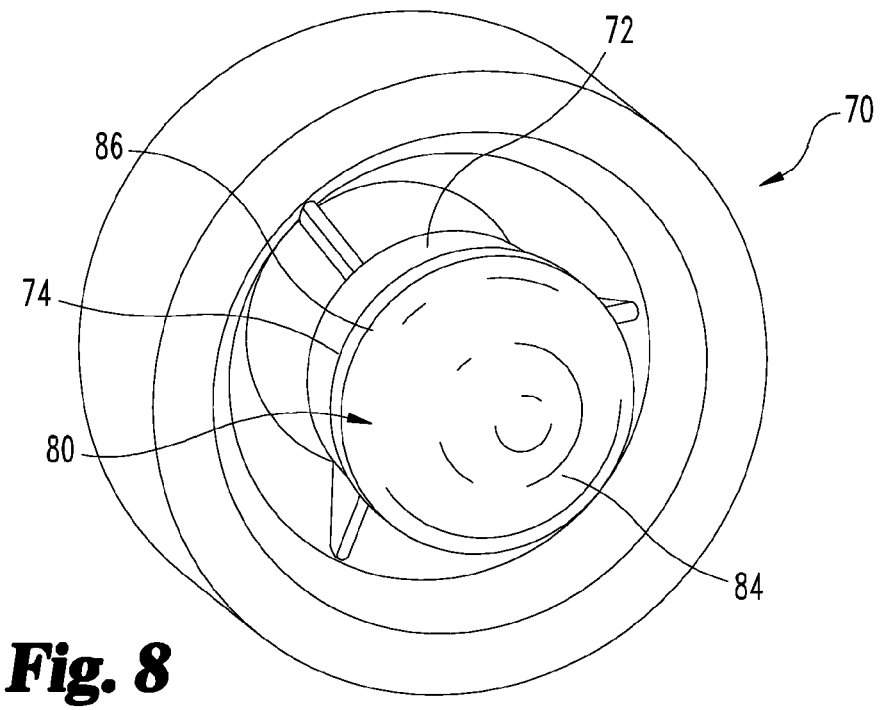
FIG. 8 is a perspective view of an exemplary check valve assembly center body and plunger from the direction the working fluid flows through the check valve assembly.

FIG. 8 is a perspective view of an exemplary embodiment of the center body 70 and the plunger 80 adjacent one another when the plunger 80 is in an open position, seen from the direction the working fluid 22 flows through the check valve assembly 60. This view shows the bottom surface 74 of the center piece 72 is adjacent the substantially planar surface 86 of valve head 84 when the plunger 80 is in the open position. This view also shows the valve head 84 having approximately the same maximum outer circumference as the maximum outer circumference of the center piece 72 in the center body 70.

Figure 9:
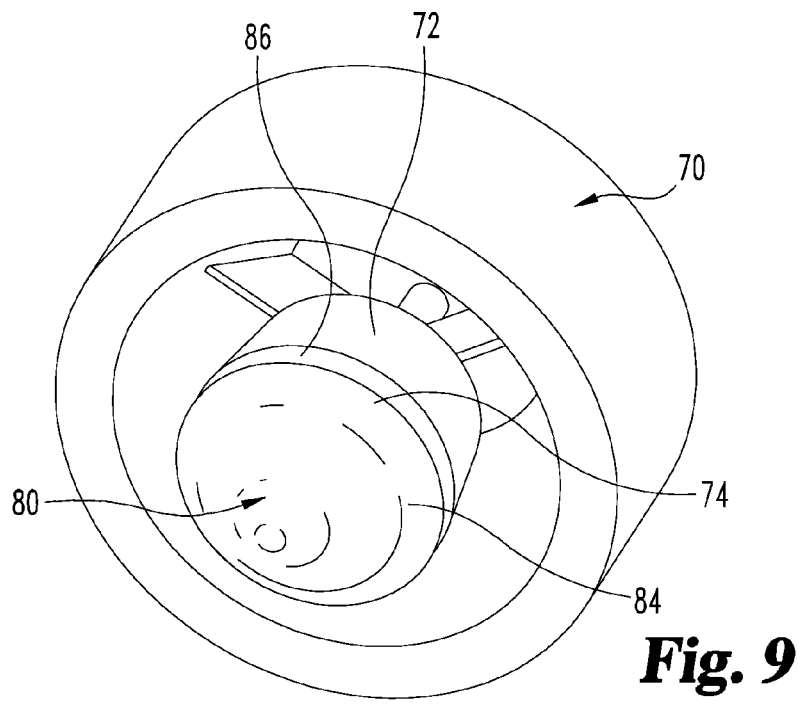
FIG. 9 is an elevated perspective view of an exemplary check valve assembly center body and plunger from the direction the working fluid flows through the check valve assembly.

FIG. 9 is a perspective view of the center body 70 and the plunger 80 adjacent one another when the plunger 80 is in an open position, in an elevated view from the direction the working fluid 22 flows through the check valve assembly 60. This view also shows the bottom surface 74 of the center piece 72 is adjacent the substantially planar surface 86 of the valve head 84 when the plunger 80 is in the open position and that the plunger valve head 84 has approximately the same maximum outer circumference as the maximum outer circumference of the center piece 72 in the center body 70.

Figure 10:
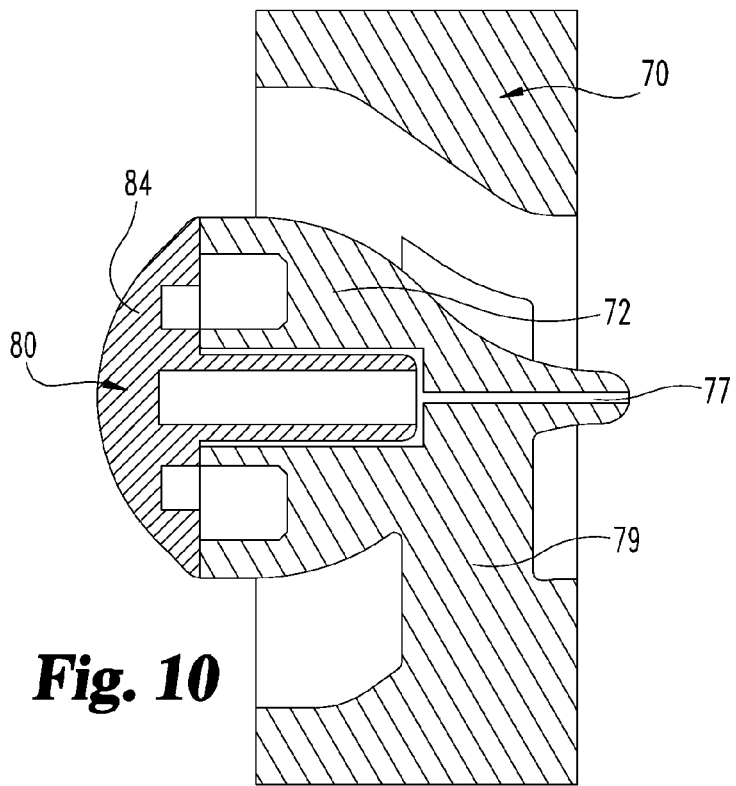
FIG. 10 is a cross-sectional side view of an exemplary center body and plunger.

FIG. 10 is a side cross-sectional view of an exemplary embodiment of the center body 70 and the plunger 80 when it is in the open position. In one embodiment, the maximum outer circumference of the plunger valve head 84 is approximately equal to the maximum outer circumference of the center piece 72, so that when the center piece 72 and the plunger valve head 84 are adjacent one another and the valve is in the open position, the flow of working fluid 22 through the center body 70 has minimum turbulence.

A cross-section of one of the guide vanes 79 is also shown in FIG. 10. In one embodiment, the guide vane does not extend the entire length of the center body 70 in the axial direction of the working fluid 22 flow, but is less than about half of the axial length of the center body 70. In one embodiment, the center body 70 directs the working fluid in an annular flow path that decreases radially in the axial direction of the working fluid flow through the center body 70. In one embodiment, there is a pressure port 77 which allows the working fluid 22 to flow out from under the valve head 84 when the valve is being pushed into an open position by the flow of working fluid 22. The pressure port 77 provides that trapped working fluid 22 will not create a force opposing the opening of plunger valve head 84.

Figure 11:
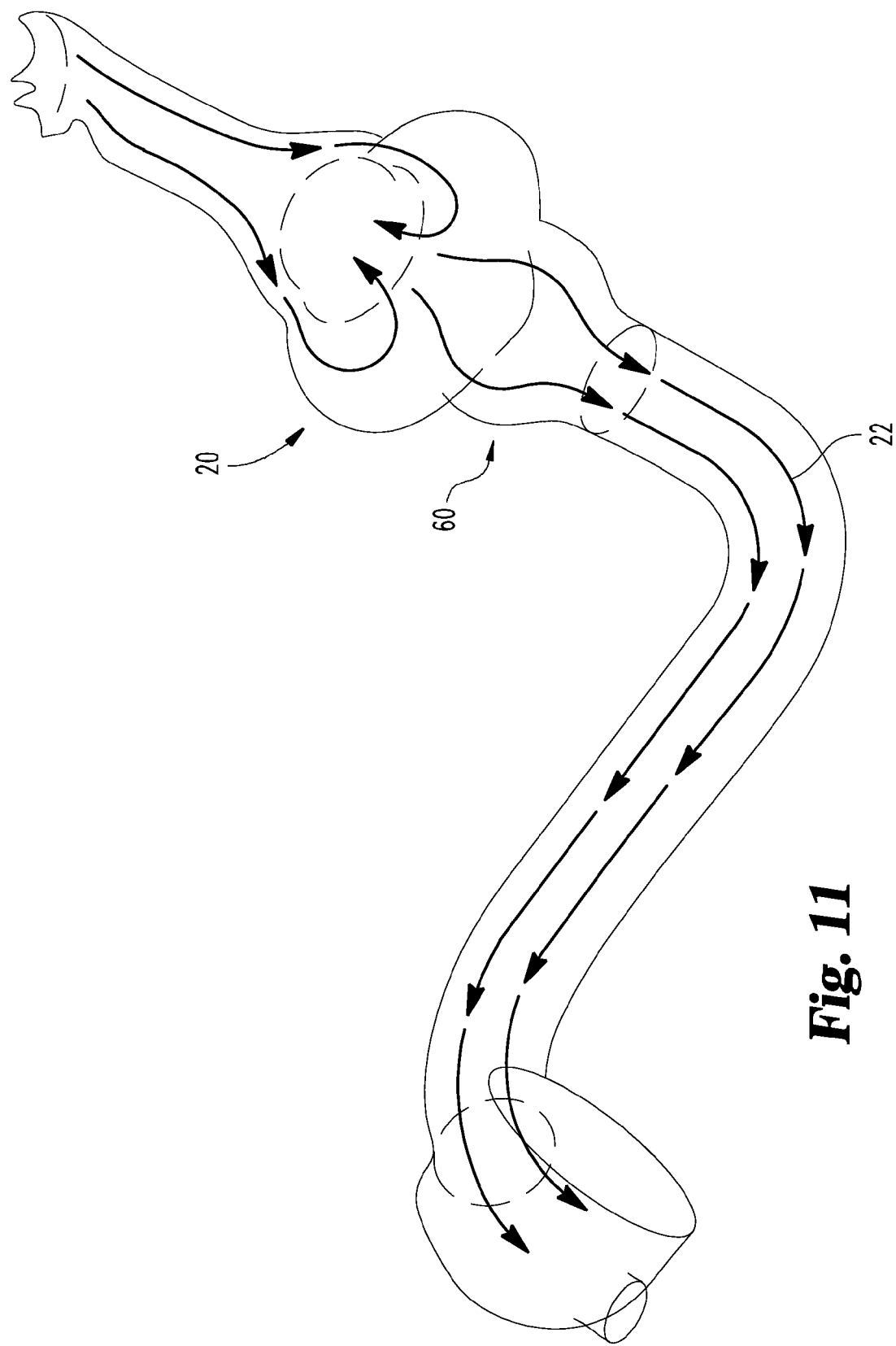
FIG. 11 is an illustration of working fluid streamlines as the working fluid travels through an exemplary pressure pulsation dampener and check valve assembly.

FIG. 11 is an illustration of working fluid streamlines as the fluid travels through an embodiment of the pressure pulsation dampener 20 with the check valve assembly 60. The combination of the pressure pulsation dampener 20 and the check valve assembly 60 described herein may decrease the pressure pulsations present in the working fluid 22.

Figure 12:
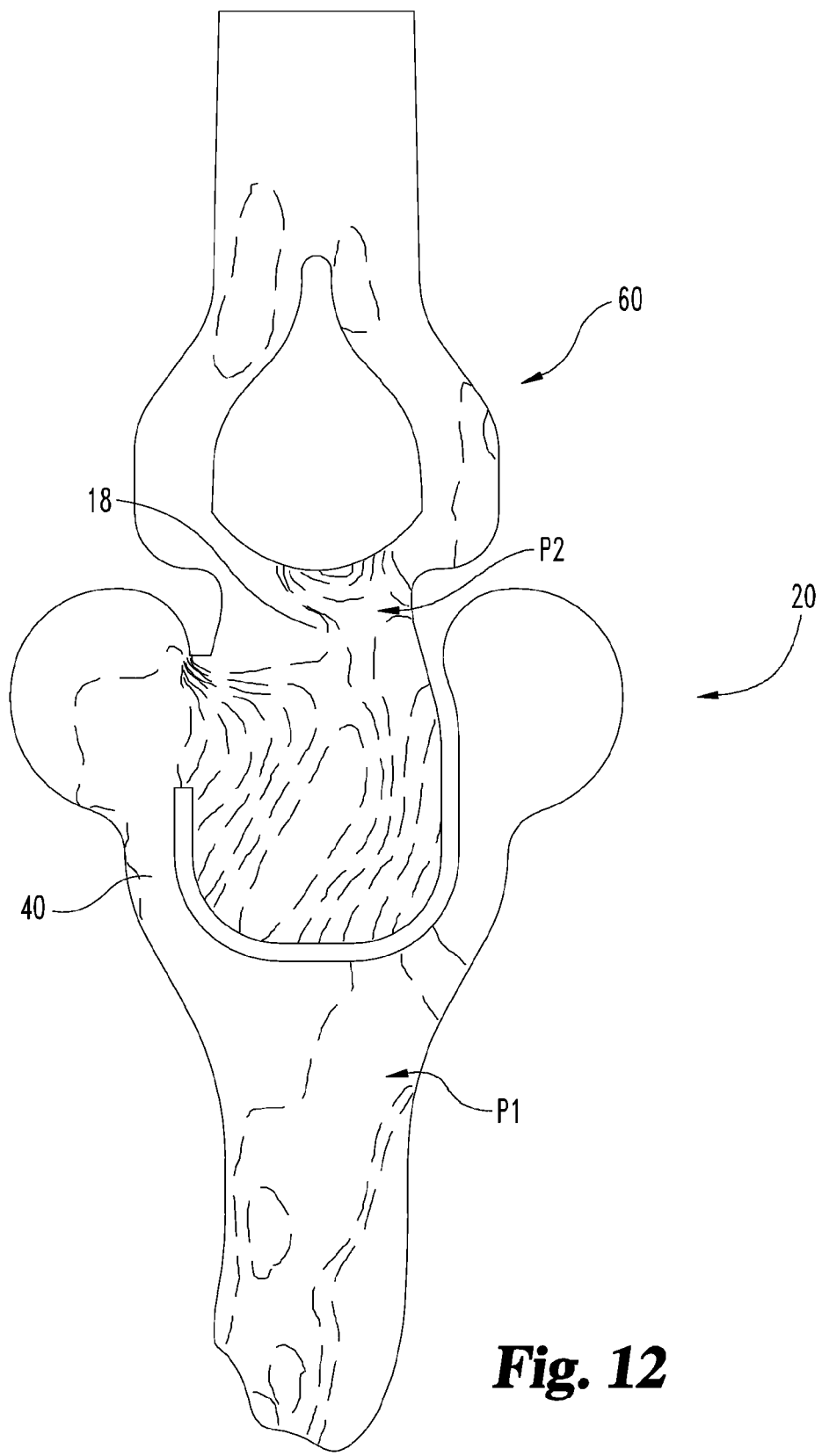
FIG. 12 is an exemplary illustration of the pressure gradients in the working fluid as the fluid travels through an exemplary pressure pulsation dampener and check valve assembly.

FIG. 12 is a diagram showing a side view of an embodiment of the pressure pulsation dampener 20 and check valve assembly 60 with lines indicating each change in pressure. The pressure gradient P1 upstream of the annular section 40 represents a pressure gradient that is larger than pressure gradient P2 that has exited the pressure pulsation dampener 20 at the exit port 18 prior to entering the check valve assembly 60.

Figure 13:
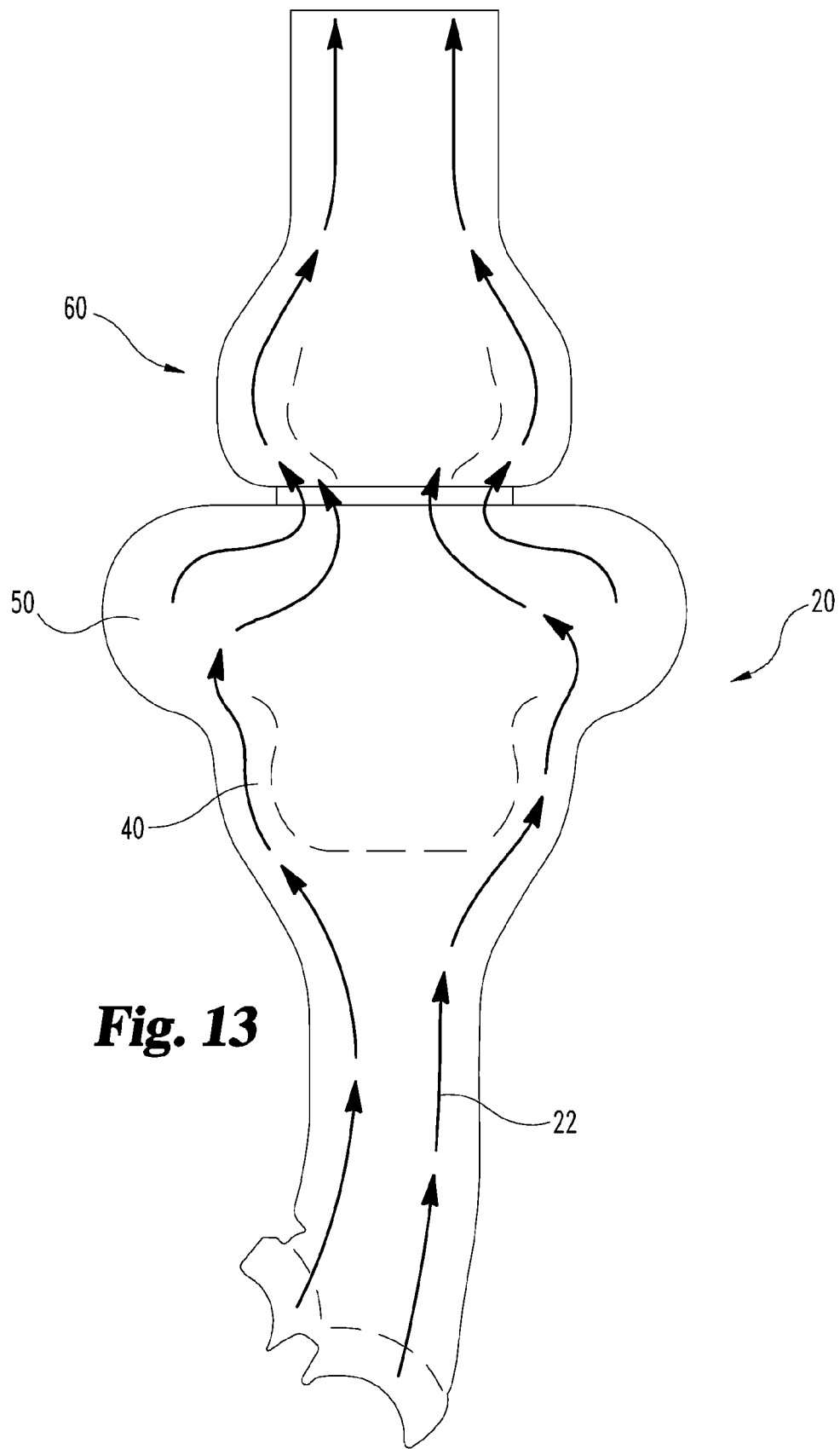
FIG. 13 is an exemplary illustration of streamlines showing working fluid flow through an exemplary pressure pulsation dampener and check valve assembly.

FIG. 13 is a side view of an embodiment of the pressure pulsation dampener 20 and check valve assembly 60 showing streamlines to represent the flow path that working fluid 22 may take through the pressure pulsation dampener 20 and check valve assembly 60. As the working fluid 22 travels from annular section 40 into the toroidal chamber 50, there may be some separated, turbulent, or recirculating flow, as shown by the streamlines and as would be understood by one of ordinary skill in the art.

Figure 14:
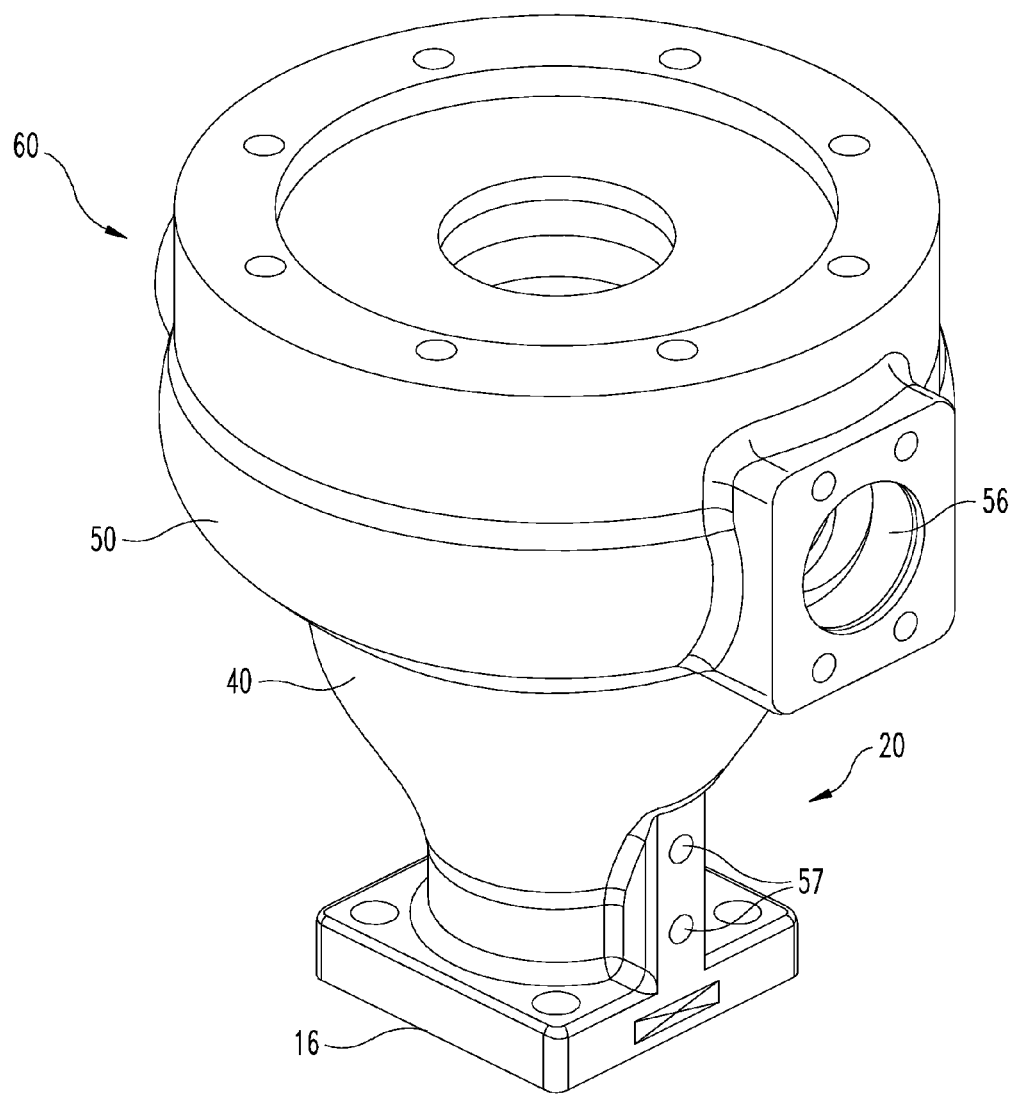
FIG. 14 is an elevated side view of an exemplary pressure pulsation dampener with check valve assembly.

FIG. 14 is a side view of an exemplary pressure pulsation dampener 20 and check valve assembly 60. In particular, FIG. 14 shows an optional entry port 56 that may be used to channel a second working fluid in a jacket 58 (see FIG. 17) around the pressure pulsation dampener 20 and/or check valve assembly 60 to effectuate heat transfer, such as cooling or heating, with the first working fluid 22. In other embodiments, port 56 may be used for other purposes, such as a clean out port, instrument port, or pressure tap. In one embodiment, pressure taps 57 are located near the inlet chamber 30 of the pressure pulsation dampener 20.

Figure 15:
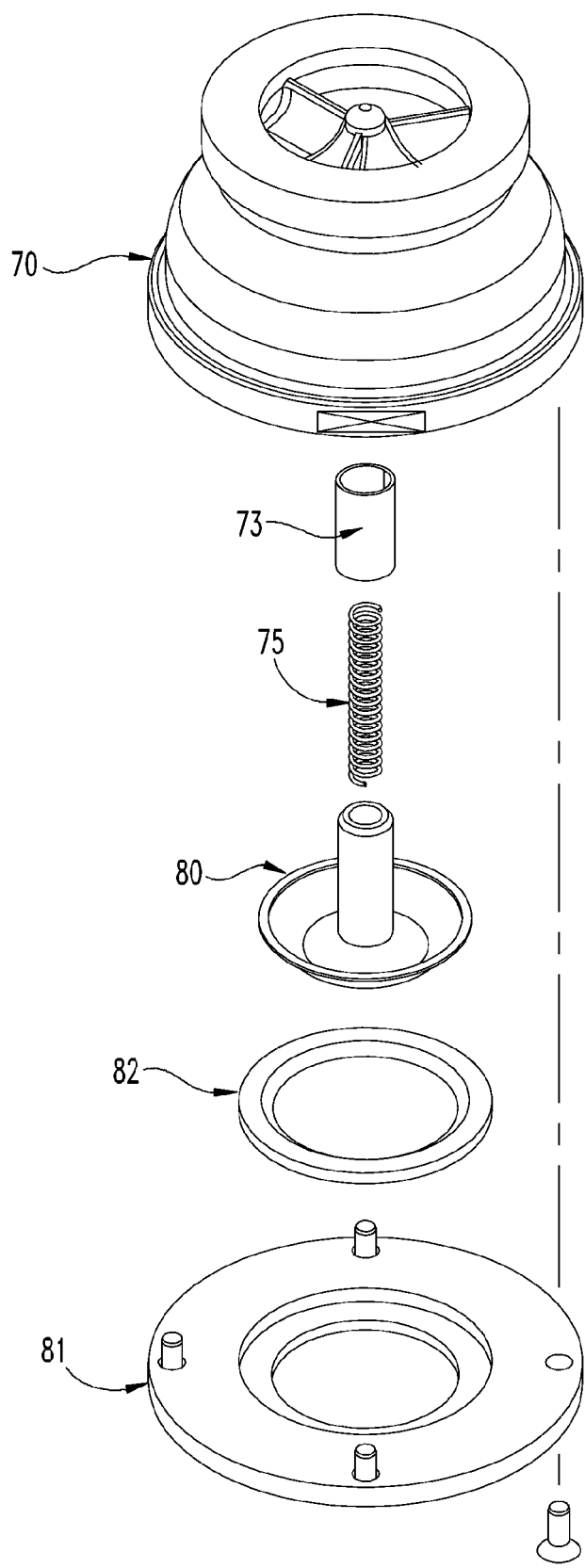
FIG. 15 is an exploded view of an exemplary check valve assembly.

FIG. 15 is an exploded view of an exemplary check valve assembly 60. In one embodiment, bias spring 75 may be partially enclosed within a sleeve 73.

Figure 16:
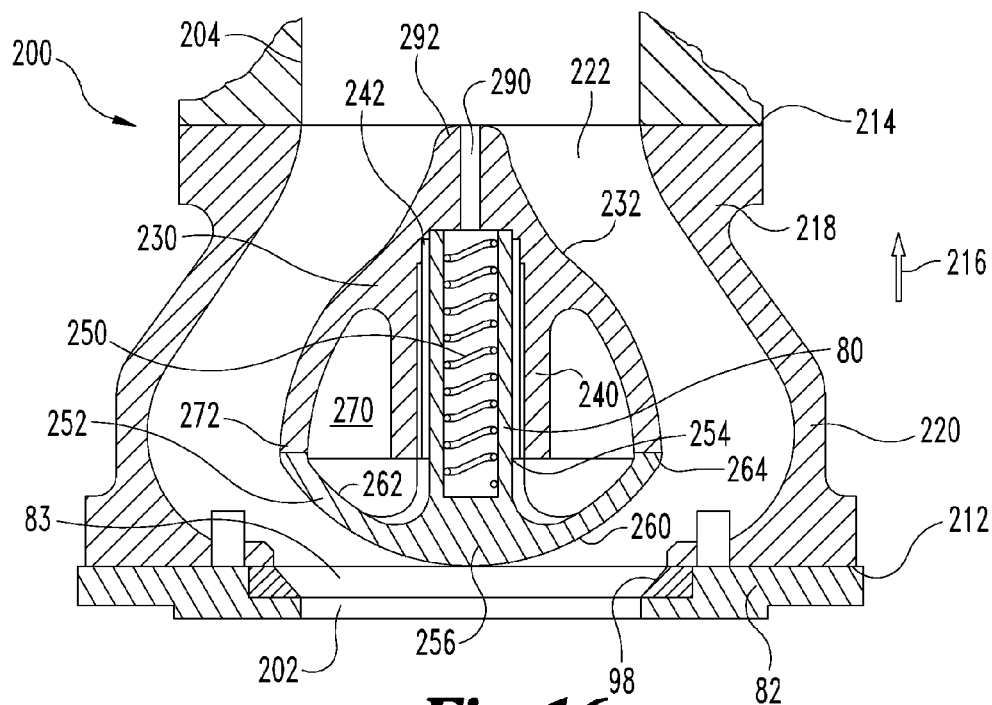
FIG. 16 is a cross-sectional side view of an exemplary check valve assembly with the valve in the open position.

FIG. 16 is a cross-sectional side view of check valve assembly with the valve head in the open position.

Figure 17:
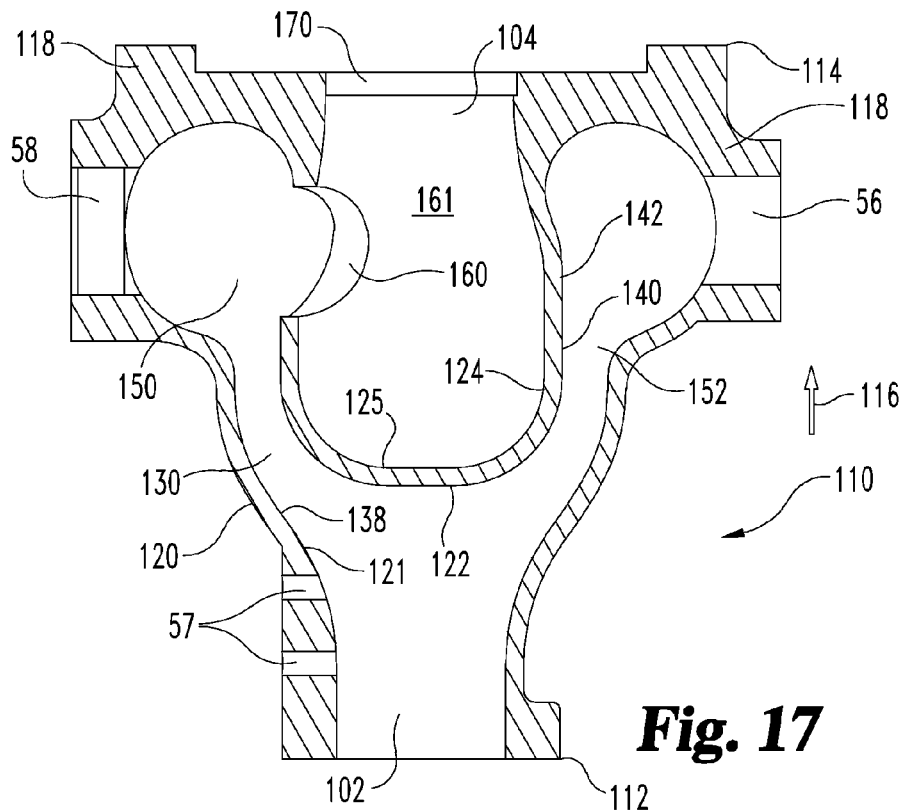
FIG. 17 is a cross-sectional side view of an exemplary pressure pulsation dampener.

FIG. 17 shows the optional location of a jacket 58 with entry port 56 for flow of a second working fluid to effectuate heat transfer with the first working fluid 22. In another embodiment, entry port 56 may also be a clean out port, for example. Pressure taps 57 may also be included, in yet another embodiment, in the body of the pressure pulsation dampener near the inlet chamber.

Figure 18:
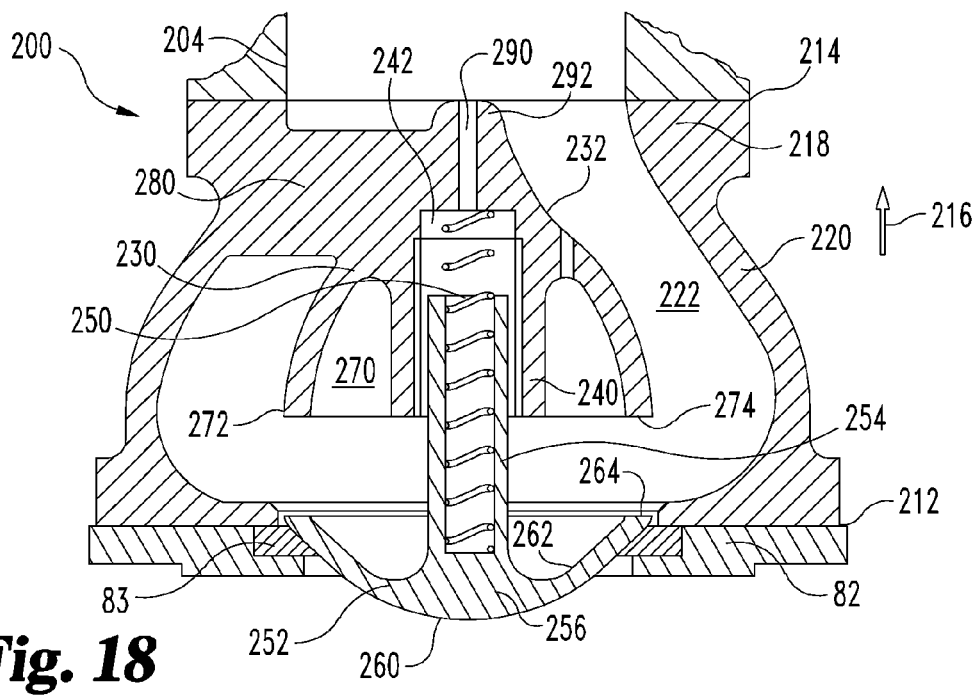
FIG. 18 is a cross-sectional side view of an exemplary check valve assembly with the valve in the closed position.

Referring to FIG. 18, a cross-sectional side view of check valve assembly with the valve head in the closed position.

Figure 19:
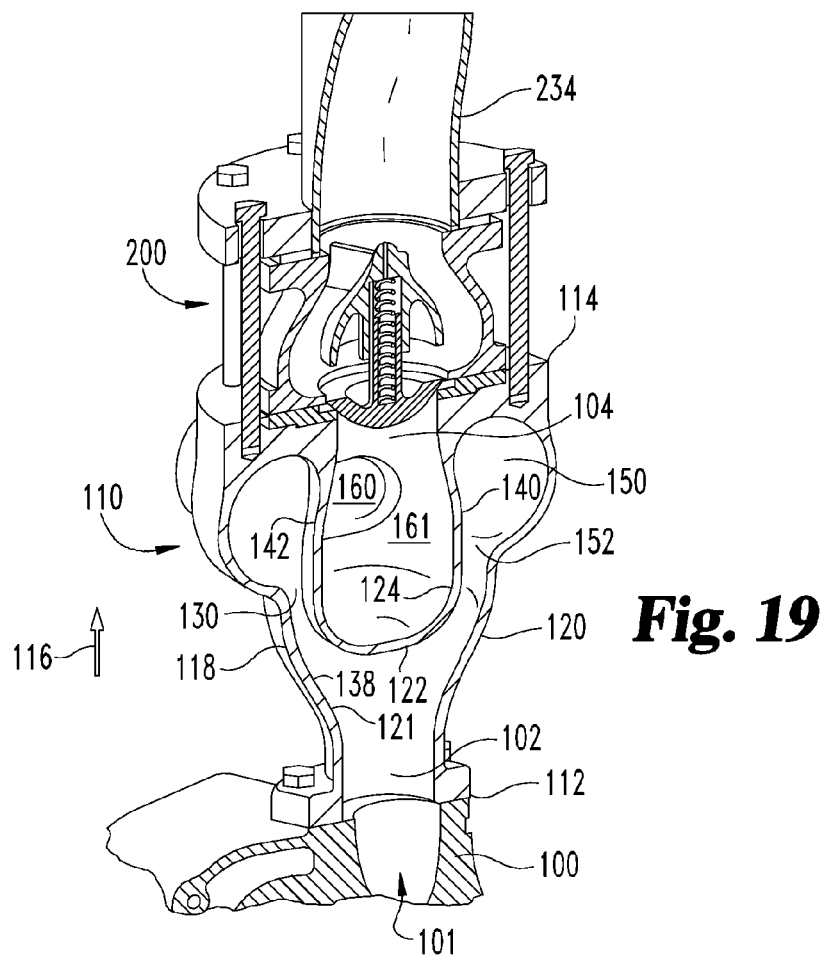
FIG. 19 is a cross-sectional cutaway of a portion of an exemplary system.

FIG. 19 is an illustration of a non-limiting example of a compressor system in accordance with an embodiment of the present specification. The compressor system may include a compressor or blower having an outlet in flow communication with the inlet of pressure pulsation dampener, directly or indirectly. The outlet of pressure pulsation dampener is in flow communication with the inlet of the check valve assembly, directly or indirectly.

Referring again to FIGS. 16-19, the operation of the pressure pulse dampener and check valve systems can be readily ascertained. A source of unsteady pressurized fluid flow 101, such as that generated by a compressor 100 can be delivered to an inlet passageway 102 of a pressure pulse dampener 110. The pulse dampener 110 extends between first and second ends 112, 114. The fluid generally flows into the inlet 102 and out of the outlet 104 in an axial direction represented by arrow 116, however it should be understood that variable flow patterns other than those described herein are contemplated as one skilled in art would understand. The pulse dampener 110 includes a housing 118 with an outer wall 120 that generally defines a radially outer flowpath boundary 121 along a length thereof. A central body 122 (also described as an inner body or center body) is positioned within the housing 118 radially inward of the outer wall 120. While terms such as central or center may be used to describe the central body 122 or other components in the system, it should be understood that those terms do not require the central body or any similarly described component to be positioned in a geometric center location of the housing 118 and may indeed be located at any desired location within the housing.

The central body 122 includes perimeter wall 124 that defines a shape of the central body 122. In one form the central body 122 can be substantially hollow and in other forms the central body can be partially hollow. A central passageway or annular flowpath 130 is formed between the outer wall 120 and the perimeter wall 124 of the central body 122. In one form the central passageway 130 is substantially bell shaped, in other forms the shape can vary as the flowpath 130 generally moves radially outward along the axial flowpath direction defined by arrow 116. The perimeter wall 120 is not limited to one configuration or shape and can be defined by any one of a plurality of shapes. In one particular form a forward end 125 may include linear portions as shown in FIG. 17, but may also include accurate portions in alternate embodiments.

The radially outer flowpath boundary 121 of the central passageway 130 can be defined by an inner surface 138 of the outer wall 120. A radially inner flowpath boundary 140 of the central passageway 130 can be defined by an outer surface 142 of the perimeter wall 124 of the central body 122. In one form a cross-sectional area of the inlet 102 can be substantially equivalent to a cross-sectional flow area of the central passageway 130 to minimize pressure losses due to expansion and contraction along the flowpath. Furthermore the cross-sectional flow area can remain substantially constant along a flow direction of the central passageway 130.

A ring or toroidal chamber 150 can be positioned downstream of the central passageway 130. The toroidal chamber 150 forms a circumferential passageway about the central body 122 and can have any cross-sectional shape desired including circular, ovalized, or combinations of linear and arcuate segments. A 360 degree transition channel 152 is positioned between the central passageway 130 and the toroidal chamber 150 and functions as a flow outlet of the central passageway 130 and a flow inlet to the toroidal chamber 150. The toroidal chamber 150 generally directs the fluid flow into a circumferential flow pattern from a generally axial and radially outward direction defined by the central passageway 130. A toroidal outlet port 160 is formed in the perimeter wall 124 of the central body 122. The outlet port 160 can be of any shape and size as desired, however in one form shown in the exemplary embodiment the shape can be ovalized and the flow area is substantially equivalent to the flow area of the transition channel 152. Individual flow streamlines will flow about the circumferential toroidal chamber 150 in either a clockwise or counter clockwise direction dictated by fluid dynamic forces such as velocity, direction, angular momentum and position of entry into the chamber 150 relative the location of the outlet port 160. As each streamline takes a different path to the outlet port, the unsteady portion of the flow caused by eddy or vorticity flow will be at least partially reduced or cancelled out which in turn causes a reduction of a portion of the pressure pulsing in the fluid flow. After the fluid exits the toroidal chamber 150 through the outlet port 160, the fluid is directed radially inward into the hollow portion 161 of the central body 122 and out of the pulse dampener 110 through the outlet flowpath 104. In some embodiments, an outlet guide vane 170 can be positioned in one or more of the flow paths of the pulse dampener 110 to promote a desired flow velocity.

With particular reference to FIGS. 16 and 18, a check valve 200 can be positioned downstream of the pulse dampener 110. The check valve 200 extends between first and second ends 212, 214. The fluid flow generally flows into the inlet passageway 202 and out of the outlet passageway 204 in an axial direction represented by arrow 216, however it should be understood that variable flow patterns other than those described herein are contemplated as one skilled in art would understand. The check valve 200 includes a housing 218 with an outer wall 220 that defines an outer radial boundary wall of a substantially S-shaped fluid flowpath or passageway 222. It should be noted that while the passageway is defined as being substantially S-shaped when viewed in cross-section on one side of an annular flowpath 222, that a reverse S-shape or other serpentine shape or type of flowpath may also describe the passageway 222.

An inner body or center body 230 is positioned within the housing 218 radially inward of the outer wall 220. An outer profile wall 232 of the inner body 230 defines an inner radial boundary wall of the S-shaped passageway 222. The S-shaped passageway 222 directs the fluid flow generally from a radial outer location to a radial inner location as the passageway 222 transitions from an annular flowpath around the inner body 230 to the outlet passageway 204 downstream of the of the inner body 230.

A valve stem channel 240 formed within the inner body 230 can extend generally along in an axial direction from the second end 214 toward the first end 212. In one form the valve stem channel 240 includes an elongate aperture 242 internal thereto for a resilient member 250 such as coil spring or the like to be located therein. A valve 252 having a valve stem 254 connected to a valve head 256 can be operably engaged with the valve stem channel 240. In one form the valve stem 254 may slidingly engage within the valve stem channel 240, in other forms the interface may be reversed wherein the valve stem 254 may include a hollow portion for the valve stem channel 240 to slidingly engage within. The valve 252 is movable between first and second positions corresponding to a fully closed position and a fully open position. The fully closed position is shown in FIG. 18 and the fully open position is shown in FIG. 16. The resilient member 250 can be coupled between the inner body 230 and the valve 252 so as to urge the valve to a normally closed position.

The valve head 256 has a generally convex outer surface 260 facing the direction of flow generally defined by arrow 216. In one form the convex outer surface 260 is a spherical shape. Other shapes are also contemplated herein. An aft side 262 of the valve head 256 extends from the valve stem 254 to an aft facing outer ring 264 forming a sealing surface with a defined width and outer diameter.

A circumferential cavity 270 can be formed around the valve stem channel 240 of the inner body 230 to space the valve stem channel 240 and a portion of the outer profile wall 232 apart from one another. The outer profile wall 232 terminates at a leading edge 272 to define a ring shaped sealing face 274 with a defined width and outer diameter. In one form the width of the sealing face 274 of the outer profile wall 232 is substantially equivalent to the width of the outer ring 264 so as to form a matching sealing interface when the valve 252 is in the open position. The defined outer diameters of the ring shaped sealing surface 274 and the outer ring 264 of the profile wall may be substantially identical to provide a substantially flush flowpath transition between the valve head 256 and the outer profile wall 232 of the inner body. In this manner pressurized fluid flow will not be able to force the valve head 256 toward the closed position or cause valve chatter as pressurized flow passes the transition region from the valve head 256 to the inner body 230 along the S-shaped passageway 222.

After passing through the S-shaped passageway 222, the pressurized fluid flow is transported through the outlet passageway 204 formed adjacent the second end 214 of the check valve housing 218. In one form the cross-sectional flow area along the outlet passageway 204 is substantially equivalent to the annulus flow area of the S-shaped passageway 222 and the inlet flow passageway 202.

One or more outlet guide vanes 280 can extend between the inner body 230 and the outer wall 220 of the check valve housing 218 across a portion of the S-shaped passageway 222. The outlet guide vanes 280 can be constructed to direct the velocity profiles of individual flow streamlines in a desired direction. In one form, a desired direction can be substantially in the axial direction as defined by arrow 216. In other forms, other directional or velocity profiles may be desired.

A vent aperture or through hole 290 can be formed in the aft end 292 of the inner body 230 and extends into the valve stem channel 240. The vent aperture 290 is configured to provide fluid communication with a relative low pressure zone at the aft end 292 of the inner body 230 to the valve stem 254 such that the low pressure will act to help keep the valve 252 in the open position and to prevent pressure build up in the valve stem channel 240 as the valve stem moves from the closed position to the open position.

In one aspect, the present disclosure defines a system comprising: a compressor operable for compressing a fluid; a pulse dampener in fluid communication with compressed fluid downstream of the compressor, the pulse dampener having a housing with an outer perimeter wall; a check valve connected downstream of the pulse dampener, the check valve having a housing with a valve positioned therein being movable between a closed position and an open position; and wherein the check valve housing includes: an outer wall extending circumferentially about the valve; an inner body spaced apart from and positioned radially inward of the outer wall; and a fluid passageway formed about the inner body in the space between the inner body and the outer wall, wherein the fluid passageway is defined by a substantially S-shaped configuration with a substantially constant cross-sectional flow area along the length of the S-shaped passageway.

In refining aspects, the present disclosure a fluid guide vane extending across the S-shaped passageway from the center body to the outer wall of the check valve housing; a check valve outlet passageway having a cross-sectional flow area substantially equivalent to the cross-sectional flow area of the S-shaped passageway; wherein the inner body further comprises: a first end positioned proximate a fluid inlet and a second end positioned proximate a fluid outlet of the check valve; a portion of an inner radial wall of the S-shaped flow path formed between the first end and second end; a sealing face having a defined width formed on a circumferential rim at a leading edge of the first end; a valve stem channel formed along an axial direction between the first end and the second end; and a hollow cavity positioned between the valve stem channel and the circumferential rim; a through aperture extending between the valve stem channel and the second end of the inner body; a biasing member positioned within the valve stem channel; wherein the biasing member is configured to urge the valve toward the closed position wherein the valve comprises: a valve head; a stem extending from the valve head being slidingly engageable with the valve stem channel of the inner body; and a valve head aft face formed on a circumferential outer perimeter of the valve head having a complementary width and shape to that of the sealing face of the center body such that when the valve is in the open position the valve head aft face and the sealing face of the inner body are in sealing engagement with one another; wherein outer edges of the valve head aft face and the sealing face are substantially aligned in a radial direction when in sealing engagement; wherein a portion of the valve head extends past the outer perimeter wall of the pulse dampener housing in the closed position; wherein the inner radial wall of the inner body projects radially inward along the S-shaped flowpath from the first to the second end an outlet passageway positioned downstream of the check valve having a cross-sectional flow area substantially equivalent the cross-sectional flow area of the S-shaped passageway; a valve seat configured to form a fluid tight seal with the valve when the valve is in the closed position; wherein the valve seat is formed with the pulse dampener housing; wherein a vent aperture is formed through an aft end of the inner body and extends to the valve stem channel; wherein the pulse dampener includes an a outlet passageway with a cross-sectional flow area substantially equivalent to the cross-sectional flow area of the S-shaped passageway; wherein the housing of the pulse dampener further comprises: first and second ends generally defining an axial flow direction; an outer circumferential wall having an inner surface defining an outer radial flowpath wall; an inlet passageway defined by the outer circumferential wall; a central body having an open cavity positioned downstream of the inlet passageway; a central passageway formed about the central body being defined by a perimeter wall of the central body and the outer circumferential wall positioned radially outward from the perimeter wall; a toroidal passageway formed around the central body downstream of the central passageway; an inlet aperture formed through the perimeter wall to provide fluid communication between the toroidal passageway and the open cavity within the central body; and an outlet passageway formed downstream of the open cavity of the central body.

Another aspect of the present disclosure defines check valve comprising: a housing having an outer wall extending between first and second ends; an inner body spaced radially inward from the outer wall; a substantially S-shaped passageway formed about the inner body to space the inner body from the outer wall, the S-shaped passageway having a substantially constant cross-sectional flow area along a flow direction extending between the first and second ends; a central inlet passageway positioned upstream of the S-shaped passageway; a central outlet passageway positioned downstream of the of the S-shaped passageway; wherein the inlet and outlet passageways include cross-sectional flow areas substantially equivalent to the cross-sectional flow area of the S-shaped passageway; and a valve positioned within the housing being movable between open and closed positions.

In refining aspects the present disclosure the inner body further comprises: a valve stem channel extending along an axial direction between the first and second ends; a side wall defining an inner radial flowpath wall of the S-shaped flowpath; and a hollow cavity formed between the valve stem channel and a first end of the side wall; wherein a circumferential ring is formed proximate the first end of the side wall; wherein the ring includes a substantially flat portion extending to an outer edge configured to form a sealing surface; wherein the valve includes a valve head having a spherical shape on a forward side facing a direction of fluid flow and ring shaped sealing surface formed on the aft side thereof; the ring shaped sealing surface of the valve head including an outer edge substantially aligned with outer edge of the circumferential ring of the sidewall of the inner body when the valve is in the open position; wherein a fluid tight seal is formed between the ring shaped sealing surface of the valve head and the circumferential ring of the inner body when the valve is in the open position; a valve stem slidingly engageable with the valve stem channel; a resilient member configured to urge the valve to the closed position; a vent aperture formed through an aft end of the inner body and extending to the valve stem channel; and a guide vane positioned within housing of the check valve.

Another aspect of the present disclosure includes a method comprising: generating a flow of pressurized fluid having unsteady pressure pulsations; reducing the pressure pulsations with a pulsation dampener, the pulsation dampener including an inlet flow passageway, an outlet flow passageway and an intermediate passageway defined by a toroidal geometry positioned at least partially radially outward of the inlet passageway; preventing back flow of pressurized fluid when the generating is reduced, wherein the preventing includes a check valve with an S-shaped passageway to transport the pressurized fluid from a radially outer locations to a radially inner location defined by a check valve exit passage, the cross-sectional flow area being substantially constant through the S-shaped passageway and the check valve exit passage; and wherein a valve seat for the check valve assembly is integral to the pressure pulsation dampener.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   a compressor operable for compressing a fluid;
   a pulse dampener in fluid communication with compressed fluid downstream of the compressor, the pulse dampener having:
      a housing with an outer perimeter wall;
      a central body positioned internal to the perimeter wall; and
      a toroidal passage formed between the outer perimeter wall and the central body;
   a check valve connected downstream of the pulse dampener, the check valve having a housing with a valve positioned therein being movable between a closed position and an open position; and
   wherein the check valve housing includes:
      an outer wall extending circumferentially about the valve;
      an inner body spaced apart from and positioned radially inward of the outer wall; and
      a fluid passageway formed about the inner body in the space between the inner body and the outer wall, wherein the fluid passageway is defined by a substantially S-shaped configuration with a substantially constant cross-sectional flow area along the length of the S-shaped passageway.

2. The system of claim 1, further comprising a fluid guide vane extending across the S-shaped passageway from the center inner body to the outer wall of the check valve housing.

3. The system of claim 1, further comprising a check valve outlet passageway having a cross-sectional flow area substantially equivalent to the cross-sectional flow area of the S-shaped passageway.

4. The system of claim 1, wherein the inner radial wall of the inner body projects radially inward along the S-shaped flowpath from the first to the second end.

5. The system of claim 1, wherein a vent aperture is formed through an aft end of the inner body and extends to the valve stem channel.

6. The system of claim 1, wherein the pulse dampener includes an a outlet passageway with a cross-sectional flow area substantially equivalent to the cross-sectional flow area of the S-shaped passageway.

7. The system of claim 1, further comprising a valve seat configured to form a fluid tight seal with the valve when the valve is in the closed position.

8. The system of claim 7, wherein the valve seat is formed with the pulse dampener housing.

9. The system of claim 1, wherein the valve comprises:
   a valve head;
   a stem extending from the valve head being slidingly engageable with the valve stem channel of the inner body; and
   a valve head aft face formed on a circumferential outer perimeter of the valve head having a complementary width and shape to that of the sealing face of the center body such that when the valve is in the open position the valve head aft face and the sealing face of the inner body are in sealing engagement with one another.

10. The system of claim 9, wherein outer edges of the valve head aft face and the sealing face are substantially aligned in a radial direction when in sealing engagement.

11. The system of claim 9, wherein a portion of the valve head extends past the outer perimeter wall of the pulse dampener housing in the closed position.

12. The system of claim 1, wherein the inner body further comprises:
   a first end positioned proximate a fluid inlet and a second end positioned proximate a fluid outlet of the check valve;
   a portion of an inner radial wall of the S-shaped flow path formed between the first end and second end;
   a sealing face having a defined width formed on a circumferential rim at a leading edge of the first end;
   a valve stem channel formed along an axial direction between the first end and the second end; and a hollow cavity positioned between the valve stem channel and the circumferential rim.

13. The system of claim 12, further comprising a through aperture extending between the valve stem channel and the second end of the inner body.

14. The system of claim 12, further comprising a biasing member positioned within the valve stem channel.

15. The system of claim 14, wherein the biasing member is configured to urge the valve toward the closed position.

16. A system comprising:
a compressor operable for compressing a fluid;
a pulse dampener in fluid communication with compressed fluid downstream of the compressor, the pulse dampener having a housing with an outer perimeter wall;
a check valve connected downstream of the pulse dampener, the check valve having a housing with a valve positioned therein being movable between a closed position and an open position; and
wherein the check valve housing includes:
an outer wall extending circumferentially about the valve;
an inner body spaced apart from and positioned radially inward of the outer wall; and
a fluid passageway formed about the inner body in the space between the inner body and the outer wall, wherein the fluid passageway is defined by a substantially S-shaped configuration with a substantially constant cross-sectional flow area along the length of the S-shaped passageway;
wherein the housing of the pulse dampener further comprises:
first and second ends generally defining an axial flow direction;
an outer circumferential wall having an inner surface defining an outer radial flowpath wall;
an inlet passageway defined by the outer circumferential wall;
a central body having an open cavity positioned downstream of the inlet passageway;
a central passageway formed about the central body being defined by a perimeter wall of the central body and the outer circumferential wall positioned radially outward from the perimeter wall;
a toroidal passageway formed around the central body downstream of the central passageway;
an inlet aperture formed through the perimeter wall to provide fluid communication between the toroidal passageway and the open cavity within the central body; and
an outlet passageway formed downstream of the open cavity of the central body.

17. A check valve comprising:
a housing having an outer wall extending between first and second ends;
an inner body spaced radially inward from the outer wall;
a substantially S-shaped passageway formed about the inner body to space the inner body from the outer wall, the S-shaped passageway having a substantially constant cross-sectional flow area along a flow direction extending between the first and second ends;
a central inlet passageway positioned upstream of the S-shaped passageway;
a central outlet passageway positioned downstream of the of the S-shaped passageway;
wherein the inlet and outlet passageways include cross-sectional flow areas substantially equivalent to the cross-sectional flow area of the S-shaped passageway; and
a valve positioned within the housing being movable between open and closed positions; and
wherein the inner body comprises:
a valve stem channel extending along an axial direction between the first and second ends;
a side wall defining an inner radial flowpath wall of the S-shaped flowpath; and
a hollow cavity formed between the valve stem channel and a first end of the side wall; and
a resilient member positioned within the valve stem channel.

18. The check valve of claim 17, further comprising a valve stem slidingly engageable with the valve stem channel.

19. The check valve of claim 17, further comprising a vent aperture formed through an aft end of the inner body and extending to the valve stem channel.

20. The check valve of claim 17, further comprising a guide vane positioned within housing of the check valve.

21. The check valve of claim 17, wherein a circumferential ring is formed proximate the first end of the side wall.

22. The check valve of claim 21, wherein the ring includes a substantially flat portion extending to an outer edge configured to form a sealing surface.

23. The check valve of claim 22, wherein the valve includes a valve head having a spherical shape on a forward side facing a direction of fluid flow and ring shaped sealing surface formed on the aft side thereof; the ring shaped sealing surface of the valve head including an outer edge substantially aligned with outer edge of the circumferential ring of the sidewall of the inner body when the valve is in the open position.

24. The check valve of claim 23, wherein a fluid tight seal is formed between the ring shaped sealing surface of the valve head and the circumferential ring of the inner body when the valve is in the open position.

* * * * *